(12) United States Patent
Choi et al.

(10) Patent No.: US 8,526,166 B2
(45) Date of Patent: Sep. 3, 2013

(54) LITHIUM ION CAPACITOR

(75) Inventors: Dong Hyeok Choi, Suwon-si (KR); Bae Kyun Kim, Seongnam-si (KR); Hak Kwan Kim, Hanam-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 195 days.

(21) Appl. No.: 13/137,559

(22) Filed: Aug. 25, 2011

(65) Prior Publication Data

US 2012/0050952 A1 Mar. 1, 2012

(30) Foreign Application Priority Data

Aug. 31, 2010 (KR) .................. 10-2010-0084816

(51) Int. Cl.
*H01G 9/00* (2006.01)
(52) U.S. Cl.
USPC ........... 361/502; 361/503; 361/504; 361/509; 361/512; 361/525
(58) Field of Classification Search
USPC ......... 361/508, 502–504, 509, 512, 523–525, 361/528, 529; 429/129, 231.3, 217, 231.8
See application file for complete search history.

(56) References Cited

U.S. PATENT DOCUMENTS

| | | | |
|---|---|---|---|
| 6,383,686 B1* | 5/2002 | Umeno et al. | 429/231.8 |
| 6,862,168 B2* | 3/2005 | Ando et al. | 361/504 |
| 7,052,803 B2* | 5/2006 | Kato et al. | 429/231.8 |
| 7,125,630 B2* | 10/2006 | Tanizaki et al. | 429/231.1 |
| 7,381,498 B2* | 6/2008 | Suhara et al. | 429/231.95 |
| 7,848,081 B2* | 12/2010 | Tanizaki et al. | 361/525 |
| 2008/0102359 A1* | 5/2008 | Kogetsu et al. | 429/129 |
| 2012/0075771 A1* | 3/2012 | Jin et al. | 361/503 |

FOREIGN PATENT DOCUMENTS

| | | |
|---|---|---|
| JP | 5-290888 | 11/1993 |
| JP | 2008-177346 | 7/2006 |
| JP | 2007-220411 | 8/2007 |
| JP | 2008-251399 | 10/2008 |
| JP | 2009-043747 | 2/2009 |

OTHER PUBLICATIONS

Korean Office Action mailed Oct. 19, 2011 for corresponding Korean Application No. 10-2010-0084816.
Japanese Office Action mailed Jan. 22, 2013 for corresponding Japanese Application No. 2011-186041.

\* cited by examiner

*Primary Examiner* — Nguyen T Ha

(57) ABSTRACT

Provided is a lithium ion capacitor. The lithium anode capacitor includes an anode including an anode active material layer including an anode current collector, first active material particles disposed on at least one surface of the anode current collector, and second active material particles disposed in pores between the first active material particles, increasing energy density of the lithium ion capacitor.

10 Claims, 2 Drawing Sheets

A

LITHIUM ION CAPACITOR

CROSS-REFERENCE TO RELATED APPLICATIONS

This application claims the benefit of Korean Patent Application No. 10-2010-0084816 filed with the Korea Intellectual Property Office on Aug. 31, 2010, the disclosure of which is incorporated herein by reference.

BACKGROUND OF THE INVENTION

1. Field of the Invention

The present invention relates to a lithium ion capacitor, and more particularly, to a lithium ion capacitor having an anode active material layer including first active material particles and second active material particles disposed in pores between the first active material particles.

2. Description of the Related Art

In general, electrochemical energy storage devices are core parts of finished products, which are essentially used in all mobile information communication devices and electronic devices. In addition, the electrochemical energy storage devices will be used as high quality energy sources in new and renewable energy fields that can be applied to future electric vehicles and mobile electronic devices.

The electrochemical energy storage devices, typically, a lithium ion battery and an electrochemical capacitor, use an electrochemical theory.

Here, the lithium ion battery is an energy device that can be repeatedly charged and discharged using lithium ions, which has been researched as an important power source having higher energy density per unit weight or unit volume than the electrochemical capacitor. However, the lithium ion battery is difficult to be commercialized due to low stability, short use time, long charge time, and small output density.

In recent times, since the electrochemical capacitor has lower energy density but better instant output and longer lifespan than the lithium ion battery, the electrochemical capacitor is being rapidly risen as a new alternative that can substitute for the lithium ion battery.

In particular, a lithium ion capacitor among the electrochemical capacitors can increase energy density without reduction in output in comparison with other electrochemical capacitors, attracting many attentions.

However, since the energy density cannot be obtained while maintaining substantially the same output density as an electric double layer capacitor for commercialization, additional researches are still needed.

In recent times, while the lithium ion capacitor uses a large capacity of graphite in comparison with another active material to increase energy density, since a maximum theoretical capacity of the graphite is 372 mAh/g, increase in capacity of the anode is limited. Moreover, actually, it is impossible to completely use the maximum theoretical capacity of the graphite.

SUMMARY OF THE INVENTION

The present invention has been invented in order to overcome the above-described problems and it is, therefore, an object of the present invention to provide a lithium ion capacitor capable of increasing a capacity of an anode and enhancing energy density by providing an anode active material layer including first active material particles and second active material particles disposed in pores between the first active material particles.

In accordance with one aspect of the present invention to achieve the object, there is provided a lithium ion capacitor including cathodes and anodes alternately disposed with the separators interposed therebetween, wherein the anode comprises an anode active material layer including an anode current collector, first active material particles disposed on at least one surface of the anode current collector, and second active material particles disposed in pores between the first active material particles.

Here, the first active material particles may include any one of natural graphite, synthetic graphite, graphitized carbon fiber, non-graphitized carbon, and carbon nanotube.

In addition, the second active material particles may include a silicon oxide.

Further, the second active material particles may have a particle size of 10 to 100 nm.

Furthermore, the anode active material layer may further include a conductive material.

In addition, the conductive material may include acetylene black.

Further, the first and second active material particles may be doped with lithium ions.

Furthermore, the second active material particles may be mixed with a volume ratio of 1/10 to 1/3 with respect to the first active material particles.

In addition, the cathode may include a current collector, and a cathode active material layer disposed on at least one surface of the current collector.

Further, the cathode active material layer may include activated carbon.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Figure 1:
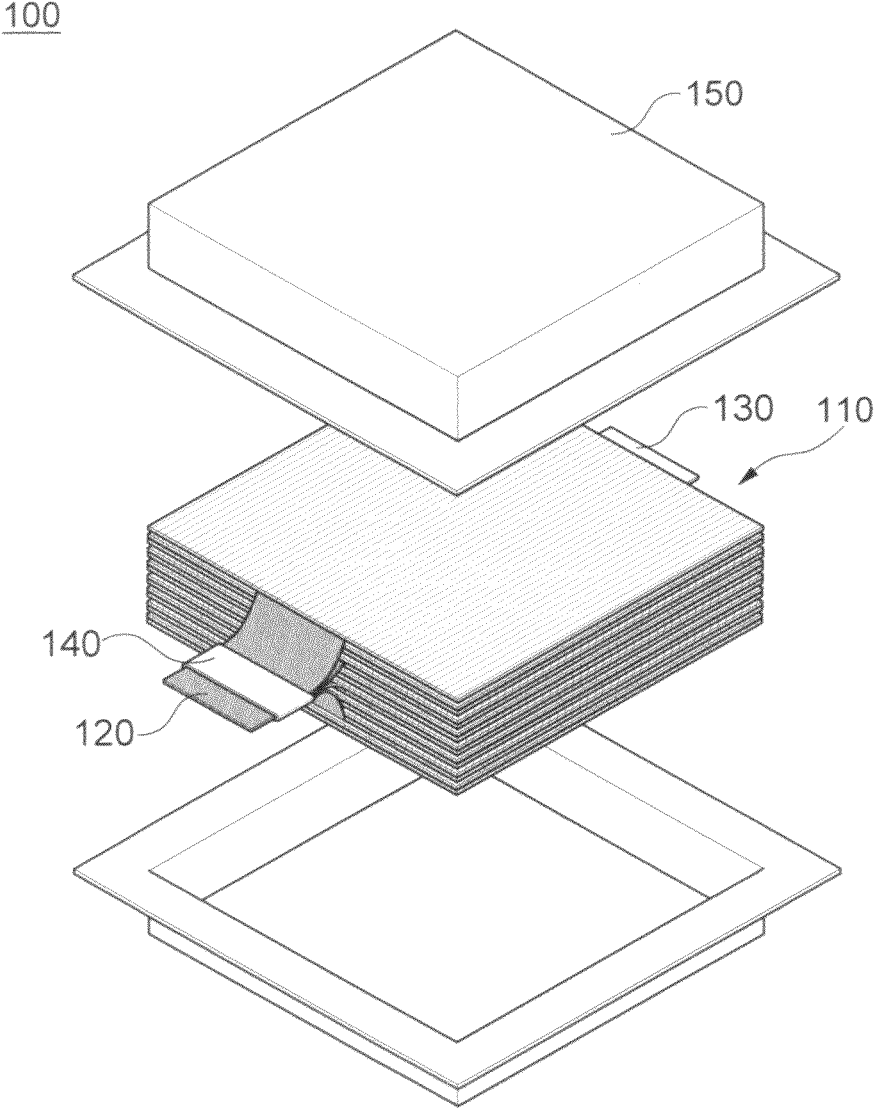
FIG. 1 is an exploded perspective view of a lithium ion capacitor in accordance with an exemplary embodiment of the present invention.

Hereinafter, embodiments of the present invention for a lithium ion capacitor will be described in detail with reference to the accompanying drawings. The following embodiments are provided as examples to fully convey the spirit of the invention to those skilled in the art.

Therefore, the present invention should not be construed as limited to the embodiments set forth herein and may be embodied in different forms. And, the size and the thickness of an apparatus may be overdrawn in the drawings for the convenience of explanation. The same components are represented by the same reference numerals hereinafter.

Figure 2:
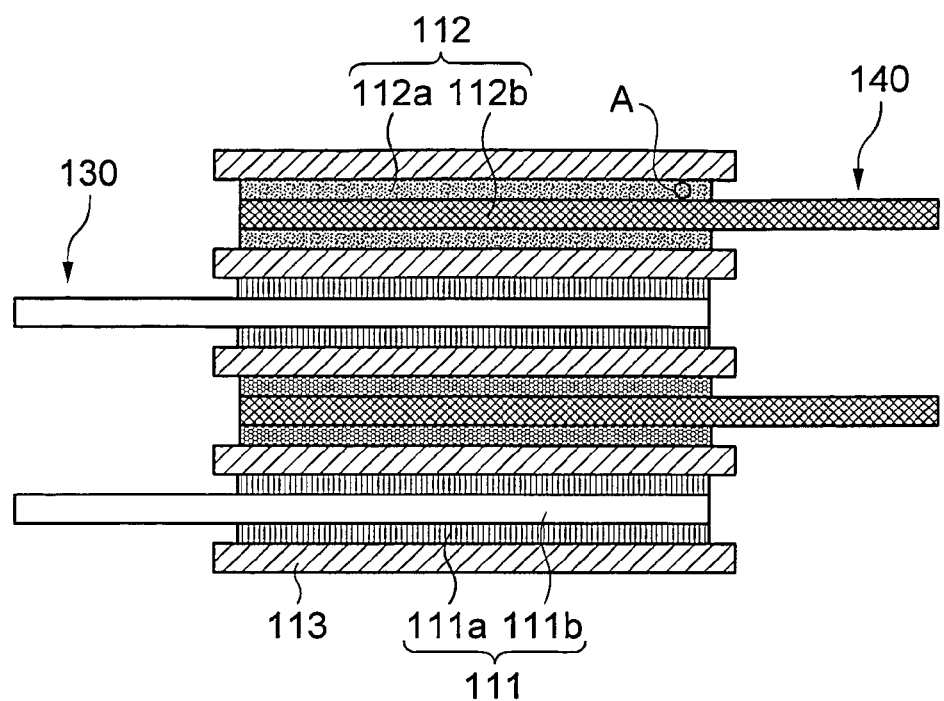
FIG. 2 is a cross-sectional view of an electrode cell shown in FIG. 1.
Figure 3:
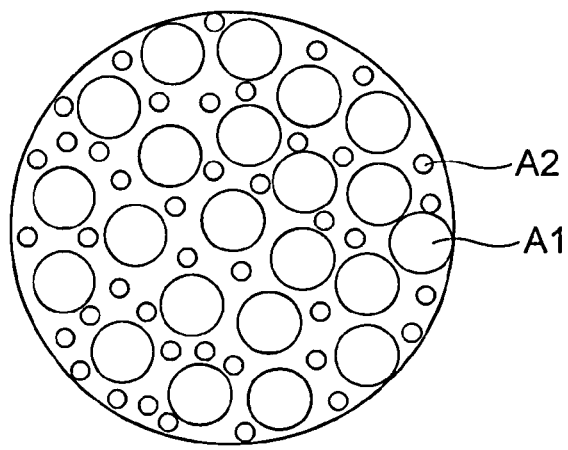
FIG. 3 is an enlarged view of a region A shown in FIG. 2.

FIG. 1 is an exploded perspective view of a lithium ion capacitor in accordance with an exemplary embodiment of the present invention, FIG. 2 is a cross-sectional view of an electrode cell shown in FIG. 1, and FIG. 3 is an enlarged view of a region A shown in FIG. 2.

Referring to FIGS. 1 to 3, a lithium ion capacitor 100 in accordance with a first exemplary embodiment of the present invention may include an electrode cell 110 immersed in an electrolyte, and a housing 150 for sealing the electrode cell 110 from the exterior thereof.

The electrode cell 110 may include cathodes 111 and anodes 112, which are alternately disposed with separators 113 interposed therebetween. At this time, the cathodes 111 and the anodes 112 may partially overlap each other. Here, the cathode 111 may be referred to as a positive electrode. In addition, the anode 112 may be referred to as a negative electrode.

The anode 112 may include an anode current collector 112a, and an anode active material layer 112b sequentially disposed on at least one surface of the anode current collector 112a.

The anode current collector 112a may be formed of a metal, for example, one of copper, nickel and stainless steel, or an alloy of two or more. The anode current collector 112a may have a thin film shape, or may include a plurality of through-holes to effectively move ions and perform a uniform doping process.

The first anode active material layer 112b may include active material particles that can reversibly dope and undope lithium ions. Here, the active material particles may include first and second active material particles A1 and A2 having different particle sized. At this time, pores between the first active material particles A2 may be filled with the second active material particles A2. Therefore, bulk density of the active material particles in the anode active material layer 112b can be increased to enhance a capacity of the anode active material layer 112b. Eventually, the capacity of the anode active material layer 112b can be increased to enhance energy density of the lithium ion capacity.

The first active material particles A1 may include at least one of natural graphite, synthetic graphite, graphitized carbon fiber, non-graphitized carbon, and carbon nanotube.

Here, the first active material particles A2 may have a particle size of 2 to 20 μm. When the first active material particles A1 have a particle size of smaller than 2 μm or less, charge/discharge cycle characteristics between the first active material particles A2 may be decreased. On the other hand, when the first active material particles A1 have a particle size of larger than 20 μm, flatness of the anode may be decreased.

The second active material particles A2 may be formed of a silicon oxide. The silicon oxide may have a larger theoretical capacity than that of graphite. Moreover, the silicon oxide may have a diameter of nano size. This is because the silicon oxide can further increase a theoretical capacity when the silicon oxide has a nano size rather than a micron size.

Here, the second active material particles A2 may have a particle size of 10 to 100 nm. When the second active material particles A2 has a particle size of smaller than 10 nm, a large amount of second active material particles A2 may be needed to fill pores between the first active material particles A1. In addition, when the second active material particles A2 have a particle size of larger than 100 nm, there is no effect of filling the pores between the first active material particles A1, and cycle lifespan characteristics of the lithium ion capacitor may be decreased due to contraction and expansion of the second active material particles A2.

Therefore, the anode active material layer 112b may further increase bulk density of the active material particles in the anode active material layer 112 in the case of further including the second active material particles in comparison with the case of including the first active material particles only. Therefore, the first active material particles A1 can be used to substantially its theoretical capacity. Moreover, since the second active material particles A2 has a higher theoretical capacity than that of the first active material particles A1, it is possible to further increase the capacity of the anode active material layer 112b. Therefore, it is also possible to increase energy density of the lithium ion capacitor 100. This is because the energy density of the lithium ion capacitor 100 can be increased according to a capacity of an electrode.

In addition, due to increase in the bulk density of the first and second active material particles A1 and A2, adhesion between the anode current collector 112a and the anode active material layer 112b can be improved to reduce a content of a binder in comparison with the conventional art, reducing an inner resistance of the lithium ion capacitor 100.

Further, due to increase in the bulk density of the first and second active material particles A1 and A2, adhesion between the anode current collector 112a and the anode active material layer 112b can be improved to secure reliability and stability of the lithium ion capacitor 100.

Furthermore, in order to increase an electrical conductivity of the anode active material layer 112b, a conductive material may be further included. Here, the conductive material may be, for example, acetylene black.

The second active material particles A2 may be mixed with a volume ratio of 1/10 to 1/3 with respect to the first active material particles A1. When the second active material particles A2 is mixed with a volume ratio of smaller than 1/10, there is no effect of increasing a capacity to fill pores between the first active material particles A1, and when mixed with a volume ratio of larger tan 1/3, cycle lifespan characteristics of the lithium ion capacity may be decreased due to contraction and expansion of the second active material particles A2 upon charge/discharge.

The anode active material layer 112b may further include a binder. Here, the binder may be one or two or more selected from fluoride-based resin such as polytetrafluoroethylene (PTFE), polyvinylidene fluoride (PVdF), and so on, thermosetting resin such as polyimide, polyamidoimide, polyethylene (PE), polypropylene (PP), and so on, cellulose-based resin such as carboximethyl cellulose (CMC), and so on, rubber-based resin such as stylenebutadiene rubber (SBR), and so on, ethylenepropylenediene monomer (EPDM), polydimethylsiloxane (PDMS), polyvinyl pyrrolidone (PVP), and so on.

Since the first anode active material layer 112b is pre-doped with lithium ions so that a potential of the first active material layer 112b can approach 0V with respect to lithium, it is possible to increase energy density of the lithium ion capacitor and improve charge/discharge cycle reliability. At this time, the potential of the first anode active material layer 112b may be variously varied according to applied products through control of a pre-doping process of the lithium ion.

In addition, the anode 112 may include an anode terminal 130 to be connected to an external power supply. The anode terminal 130 may extend from the anode current collector 112a. Here, since the anode terminal 130 may extend from the respective anode current collectors 112a to be stacked in plural, the stacked anode terminals 130 may be integrally formed by ultrasonic bonding to be easily connected to the external power source. In addition, the anode terminal 130 may include a separate external terminal, and the anode terminal 130 may be connected to the external terminal by bonding or welding.

The cathode 111 may include a cathode current collector 111a, and a cathode active material layer 111b disposed on at least one surface of the cathode current collector 111a.

Here, the cathode current collector 111a may be formed of a metal, for example, any one of aluminum, stainless steel, copper, nickel, titanium, tantalum and niobium, or an alloy thereof. The cathode current collector 111a may have a thin film or mesh shape.

In addition, the cathode active material layer 111b may include a carbon material to which ions can be reversibly doped and undoped, i.e., activated carbon. Further, the cathode active material layer 111b may further include a binder. Here, the binder may be formed of a material, for example, one or two or more selected from fluoride-based resin such as polytetrafluoroethylene (PTFE), polyvinylidene fluoride (PVdF), and so on, thermosetting resin such as polyimide, polyamidoimide, polyethylene (PE), polypropylene (PP), and so on, cellulose-based resin such as carboximethyl cellulose (CMC), and so on, rubber-based resin such as stylenebutadiene rubber (SBR), and so on, ethylenepropylenediene monomer (EPDM), polydimethylsiloxane (PDMS), polyvinyl pyrrolidone (PVP), and so on. Further, the cathode active material layer 111b may further include a conductive material, for example, carbon black, solvent, and so on.

However, in this embodiment of the present invention, the material of the cathode active material layer 111b is not limited thereto.

Here, the cathode 111 may include a cathode terminal 120 to be connected to an external power source. The cathode terminal 120 may be formed by bonding a separate terminal thereto, or may extend from the cathode current collector 111a of the cathode 111.

In addition, the cathode terminal 120 and the anode terminal 130 may include insulating members 140 installed at portions of upper and lower parts thereof, respectively. The insulating members 140 may function to secure insulation between the cathode terminal 120, the anode terminal 130 and the housing 150, which is to be described.

The separator 113 may function to electrically separate the cathode 111 and the anode 112 from each other. While the separator 113 may be formed of paper or non-woven fabric, kinds of the separator in the embodiment of the present invention is not limited thereto.

While the electrode cell 110 of this embodiment of the present invention has been shown and described as being formed in a pouch type, the electrode cell 110 is not limited thereto but may be formed in a wound type in which the cathode 111, the anode 112 and the separator 113 are wound in a roll shape.

The electrode cell 110 is immersed in the electrolyte. At this time, the cathode active material layer 111b of the cathode layer 111, the first and second anode active material layers 112b and 112c of the anode 112, and the separator 113 may be immersed in the electrolyte.

The electrolyte may function as a medium that can move lithium ions, and may include an electrolytic material and solution. Here, the electrolytic material may include any one lithium salt of $LiPF_6$, $LiBF_4$ and $LiClO_4$. Here, the lithium salt may function as a source of lithium ions doped to the anode upon charge of the lithium ion capacitor. In addition, a material used as solvent in the electrolyte may be any one or mixed solvent of two or more selected from propylene carbonate, ethylene carbonate, diethyl carbonate, dimethyl carbonate, and ethyl methyl carbonate.

The electrode cell 110 immersed in the electrolyte may be sealed by the housing 150. Here, while the housing 150 may be formed by hot-melting two sheets of laminated films, the housing 150 of the embodiment of the present invention is not limited thereto but may be formed of a metal can.

Therefore, as described in the embodiment of the present invention, the anode active material layer including the first active material particles and the second active material particles disposed in pores between the first active material particles is provided to increase a capacity of the active material particles, enhancing energy density of the lithium ion capacity.

In addition, the anode active material layer including the first active material particles and the second active material particles disposed in pores between the first active material particles is provided to secure reliability and stability of the lithium ion capacity.

As can be seen from the foregoing, the lithium ion capacitor in accordance with the present invention has the anode active material layer including the first active material particles and the second active material particles disposed in pores between the first active material particles to increase a capacity of the active material particles, enhancing energy density of the lithium ion capacity.

In addition, the lithium ion capacitor in accordance with the present invention has the anode active material layer including the first active material particles and the second active material particles disposed in pores between the first active material particles, securing reliability and stability of the lithium ion capacity.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A lithium ion capacitor including cathodes and anodes alternately disposed with the separators interposed therebetween,
   wherein the anode comprises an anode active material layer including an anode current collector, first active material particles disposed on at least one surface of the anode current collector, and second active material particles disposed in pores between the first active material particles.

2. The lithium ion capacitor according to claim 1, wherein the first active material particles comprise any one of natural graphite, synthetic graphite, graphitized carbon fiber, non-graphitized carbon, and carbon nanotube.

3. The lithium ion capacitor according to claim 1, wherein the second active material particles comprise a silicon oxide.

4. The lithium ion capacitor according to claim 1, wherein the second active material particles have a particle size of 10 to 100 nm.

5. The lithium ion capacitor according to claim 1, wherein the anode active material layer further comprises a conductive material.

6. The lithium ion capacitor according to claim 5, wherein the conductive material comprises acetylene black.

7. The lithium ion capacitor according to claim 1, wherein the first and second active material particles are doped with lithium ions.

8. The lithium ion capacitor according to claim 1, wherein the second active material particles are mixed with a volume ratio of 1/10 to 1/3 with respect to the first active material particles.

9. The lithium ion capacitor according to claim 1, wherein the cathode comprises a current collector, and a cathode active material layer disposed on at least one surface of the current collector.

10. The lithium ion capacitor according to claim 9, wherein the cathode active material layer comprises activated carbon.

* * * * *